(12) United States Patent
Sakurai et al.

(10) Patent No.: US 10,994,455 B2
(45) Date of Patent: May 4, 2021

(54) FRP SHEET PRESS MOLDING METHOD AND DEVICE AND FRP MOLDED ARTICLE

(71) Applicant: HONDA MOTOR CO., LTD., Tokyo (JP)

(72) Inventors: Motoki Sakurai, Tochigi (JP); Kenji Hayashi, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 30 days.

(21) Appl. No.: 16/082,062

(22) PCT Filed: Mar. 23, 2017

(86) PCT No.: PCT/JP2017/011773
§ 371 (c)(1),
(2) Date: Sep. 4, 2018

(87) PCT Pub. No.: WO2017/164323
PCT Pub. Date: Sep. 28, 2017

(65) Prior Publication Data
US 2019/0255746 A1    Aug. 22, 2019

(30) Foreign Application Priority Data

Mar. 24, 2016   (JP) .............................. JP2016-060726

(51) Int. Cl.
*B29C 45/03*   (2006.01)
*B29C 45/00*   (2006.01)
(Continued)

(52) U.S. Cl.
CPC .......... *B29C 45/0046* (2013.01); *B29C 41/22* (2013.01); *B29C 45/1418* (2013.01);
(Continued)

(58) Field of Classification Search
CPC .......... B29C 45/0046; B29C 45/14786; B29C 41/22; B29C 45/1418; B29C 45/26; B29K 2077/00; B29K 2995/0063
See application file for complete search history.

(56) References Cited

U.S. PATENT DOCUMENTS

2002/0172803 A1* 11/2002 Delusky ................. B65G 21/06
428/156

FOREIGN PATENT DOCUMENTS

DE   102010045220 A1 *  3/2012  ....... B29C 45/14811
JP        62-127214        6/1987
(Continued)

OTHER PUBLICATIONS

Canadian Office Action dated Jul. 9, 2019, 4 pages.
International Search Report, dated Jun. 13, 2017 (dated Jun. 13, 2017), 2 pages.

*Primary Examiner* — Ryan M Ochylski
(74) *Attorney, Agent, or Firm* — Rankin, Hill & Clark LLP (57) ABSTRACT

Provided are: an FRP sheet press molding method and device whereby yield can be improved without opening/closing adjustment of a mold after mold clamping; and an FRP molded article. The FRP sheet press molding method, whereby a press-molded article PM is molded using a fiber-reinforced plastic sheet material SM, comprises: a press step in which molds 2, 3 are closed and the heated sheet material SM is press-molded inside a cavity 5; and a filling step in which the closed state of the molds 2, 3 is maintained from the press step, a molten resin MP is pressure-injected into a gap IS that occurs between the sheet material SM and the cavity 5, and a surface of the sheet material SM and a surface of the molten resin MP are caused to come in contact with the cavity 5.

1 Claim, 6 Drawing Sheets

(51) Int. Cl.
*B29C 45/14* (2006.01)
*B29C 45/26* (2006.01)
*B29C 41/22* (2006.01)
*B29K 77/00* (2006.01)

(52) U.S. Cl.
CPC ........ *B29C 45/14786* (2013.01); *B29C 45/26* (2013.01); *B29K 2077/00* (2013.01); *B29K 2995/0063* (2013.01)

(56) References Cited

FOREIGN PATENT DOCUMENTS

| JP | 05-185466 | 7/1993 |
| JP | 2010-274636 | 12/2010 |
| JP | 2013-095093 A | 5/2013 |
| JP | 2014-148124 | 8/2014 |

\* cited by examiner

FRP SHEET PRESS MOLDING METHOD AND DEVICE AND FRP MOLDED ARTICLE

TECHNICAL FIELD

The present invention relates to an FRP sheet press molding method and device for molding a press-molded article using a fiber-reinforced plastic, and an FRP molded article.

BACKGROUND ART

A technique of molding a press-molded article using an FRP material (fiber-reinforced plastic) has a process of filling a resin inside a mold to be press molded (see, for example, Patent Document 1).

Patent Document 1: Japanese Unexamined Patent Application, Publication No. H05-185466

DISCLOSURE OF THE INVENTION

Problems to be Solved by the Invention

The technique described in Patent Document 1 is intended to improve, in particular, the surface appearance, and it is necessary to add a process of opening the mold at a constant distance when closing the mold. Further, depending on the strength of the material, the material cannot completely abut against front and back cavities at the time of stamping, and unevenness occurs on the back surface of the press-molded article. Therefore, the yield of the press-molded article is bad.

An object of the present invention is to provide an FRP sheet press molding method and device, and an FRP molded article, which can improve the yield without performing the opening/closing adjustment of the mold after mold clamping.

Means for Solving the Problems

In order to achieve the above object, the present invention provides an FRP sheet press molding method for molding a press-molded article (for example, a press-molded article PM to be described later), using a fiber-reinforced plastic (for example, a sheet material SM to be described later), the method including: a press step of press-molding the heated fiber-reinforced plastic in a cavity (for example, a cavity 5 to be described later) by closing a molding die (for example, molds 2 and 3 to be described later); and a filling step of pressure-injecting a resin (for example, a molten resin MP to be described later) into a gap (for example, a gap IS to be described later) generated between the fiber-reinforced plastic and the cavity, while maintaining a closed state of the molding die from the press step, and bringing a surface of the fiber-reinforced plastic and a surface of the resin into contact with the cavity.

As described above, according to the FRP sheet press molding method, it is possible to increase (restore) the density of the fiber-reinforced plastic by pressure-injecting the resin to the portion in which the fiber-reinforced plastic is narrowed and the density is lowered. Therefore, it is possible to form a press-molded article along the shape of the molding surface of the cavity, without performing the opening/closing adjustment of the mold after clamping the molding die. As a result, the yield of the press-molded article can be improved.

Further, the cavity is preferably provided with a plurality of rib molding grooves (for example, a rib molding groove 6 to be described later), and in the filling step, it is preferable to use the plurality of rib molding grooves as a resin filling runner.

As a result, when the gap formed between the fiber-reinforced plastic and the cavity is small, the flow distance of the pressure-injected resin is short, and the rib molding groove does not exist, even if a portion to be unfilled is assumed, it is possible to reliably fill the resin. Further, for the press-molded article manufactured, it is possible to expect a reinforcement effect of strength and rigidity of the base material itself due to the rib.

Alternatively, in order to attain the above-mentioned object, the present invention provides an FRP sheet press molding device which molds a press-molded article (for example, a press-molded article PM to be described later) with a fiber-reinforced plastic (for example, a sheet material SM to be described later), using a molding die (for example, molds 2 and 3 to be described below), wherein the molding die is provided with a sprue (for example, a sprue 7 to be described later) connected to the cavity (for example, a cavity 5 to be described later), after the heated fiber-reinforced plastic is press-molded in the cavity by closing the molding die, a resin (for example, a molten resin MP to be described later) is pressure-injected via the sprue into a gap (for example, a gap IS to be described below) generated between the fiber-reinforced plastic and the cavity, while maintaining a closed state of the molding die, and is used so that a surface of the fiber-reinforced plastic and a surface of the resin are brought into contact with the cavity.

In this way, according to the FRP sheet press molding device, it is possible to increase (restore) the density of the fiber-reinforced plastic, by pressure-injecting the resin to the portion in which the fiber-reinforced plastic is narrowed and the density is lowered. Therefore, it is possible to form a press-molded article along the shape of the molding surface of the cavity, without performing the opening/closing adjustment of the mold after clamping the molding die. As a result, the yield of the press-molded article can be improved.

Further, it is preferable that the cavity includes a plurality of rib molding grooves (for example, rib molding grooves 6 to be described later), and the plurality of rib molding grooves is used as a resin filling runner.

Therefore, when the gap formed between the fiber-reinforced plastic and the cavity is small, the flow distance of the pressure-injected resin is short, and the rib molding groove does not exist, even if a portion to be unfilled is assumed, it is possible to reliably fill the resin. Further, for the press-molded article manufactured, it is possible to expect reinforcement effect of strength and rigidity of the base material itself due to the rib.

Alternatively, in order to attain the above object, the present invention provides an FRP molded article which includes a fiber-reinforced plastic (for example, a sheet material SM to be described later) press-molded in a cavity (for example, a cavity 5 to be described later) of a molding die (for example, molds 2 and 3 to be described later), and a resin (for example, a molten resin MP to be described later) which is pressure-injected into a gap (for example, a gap IS to be described later) formed between the fiber-reinforced plastic and the cavity to bring a surface of the fiber-reinforced plastic and a surface of the resin into contact with the cavity.

As described above, according to the FRP molded article, the resin is pressure-injected to the portion in which the fiber-reinforced plastic is narrowed and the density decreases, and the density of the fiber-reinforced plastic is restored. For this reason, it is possible to follow the shape of the molding surface of the cavity, without performing the opening/closing adjustment of the mold after clamping the molding die. Consequentially, the FRP molded article can be manufactured with improved yield.

Further, it is preferable that the resin flows through a plurality of rib molding grooves (for example, rib molding grooves 6 to be described later) provided in the cavity as a resin filling runner.

As a result, it is possible to expect a reinforcing effect of strength and rigidity of the base material itself due to the rib.

Effects of the Invention

According to the present invention, it is possible to provide an FRP sheet press molding method and device, and an FRP molded article capable of improving the yield, without performing the opening/closing adjustment of the mold after mold clamping.

BRIEF DESCRIPTION OF THE DRAWINGS

FIGS. 3A to 3C are an enlarged cross-sectional view of an FRP sheet press molding device 1 illustrating a flow of molding a press-molded article PM, FIG. 3A illustrates a state in which a plurality of rib molding grooves 6 is filled with molten resin MP, FIG. 3B illustrates a state in which the molten resin MP is pressurized and filled in a gap IS formed between the sheet material SM and the cavity 5 from a plurality of rib molding grooves 6, and FIG. 3C illustrates a state in which the filling of the molten resin MP with respect to the gap IS generated between the sheet material SM and the cavity 5 is completed.

PREFERRED MODE FOR CARRYING OUT THE INVENTION

Figure 1:
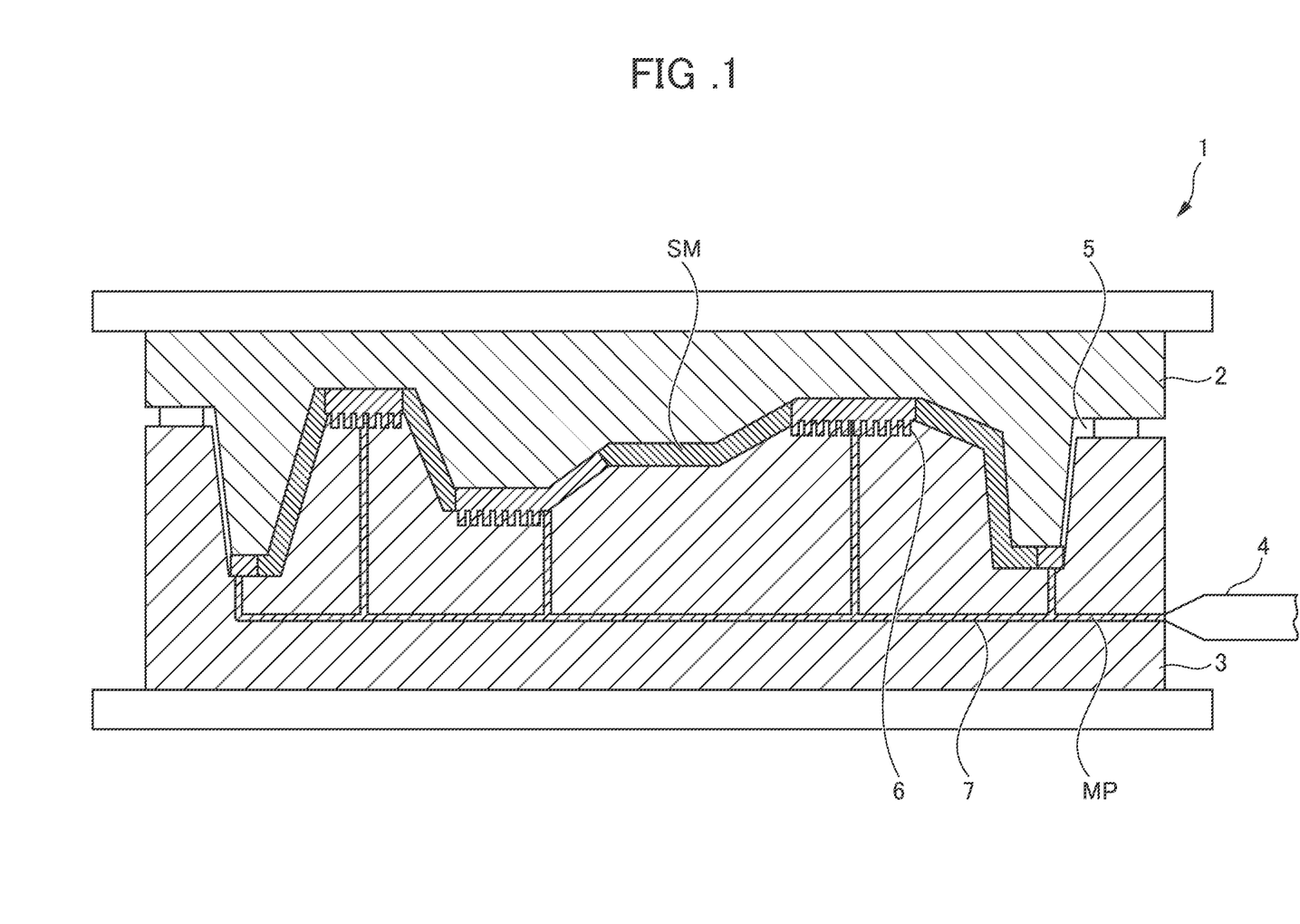
FIG. 1 is a longitudinal sectional view illustrating an FRP sheet press molding device 1 according to an embodiment of the present invention.
Figure 2A:
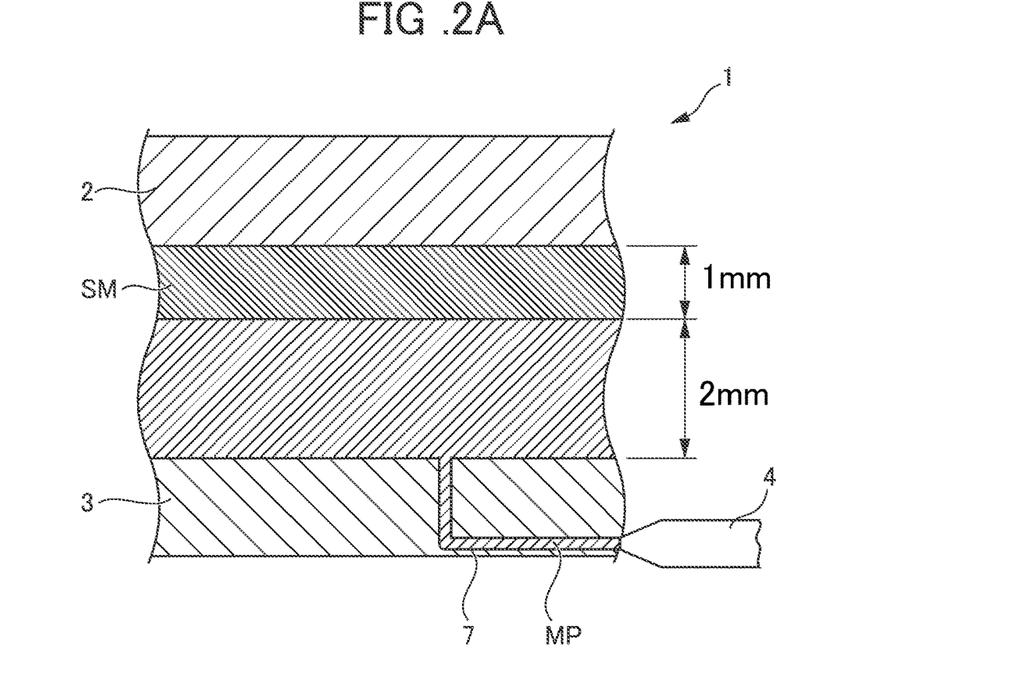
FIG. 2A is an enlarged sectional view illustrating a main part of an FRP sheet press molding device 1.
Figure 2B:
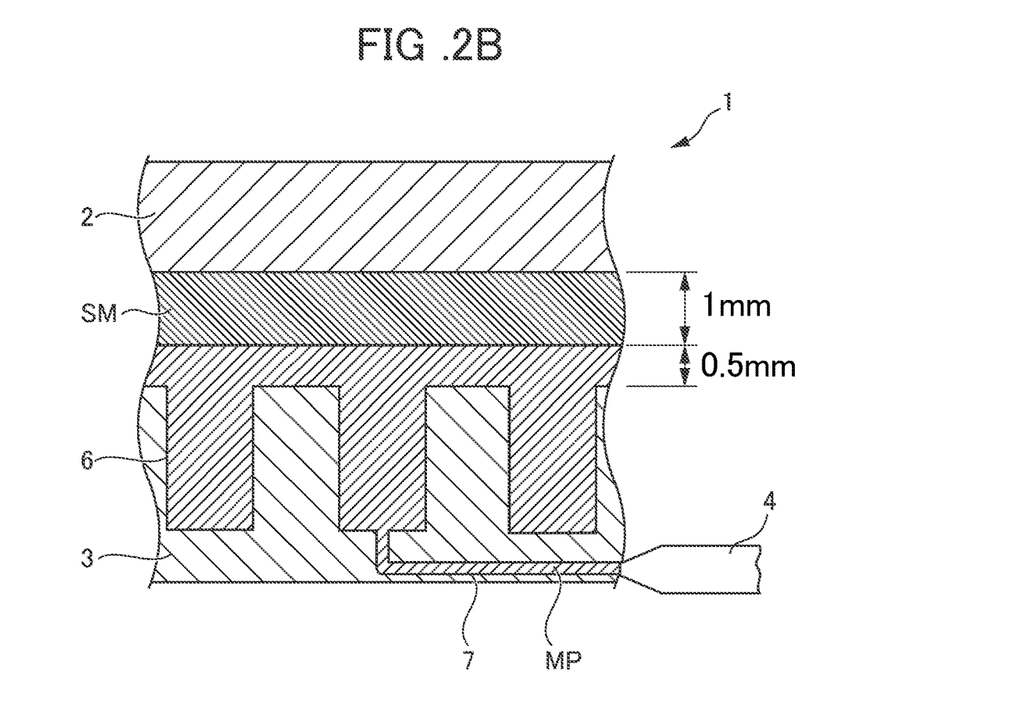
FIG. 2B is an enlarged sectional view illustrating a main part of a comparative example.
Figure 3A:
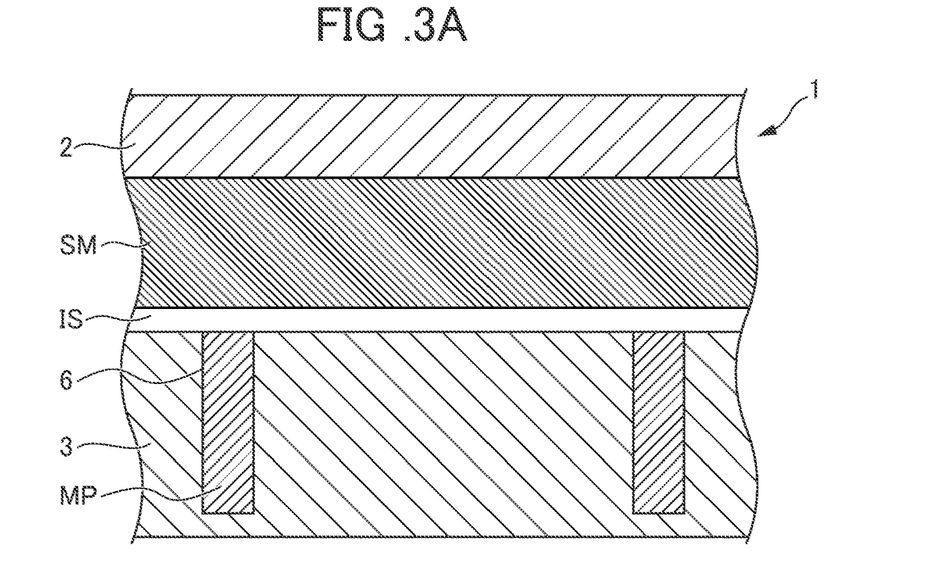
Figure 3B:
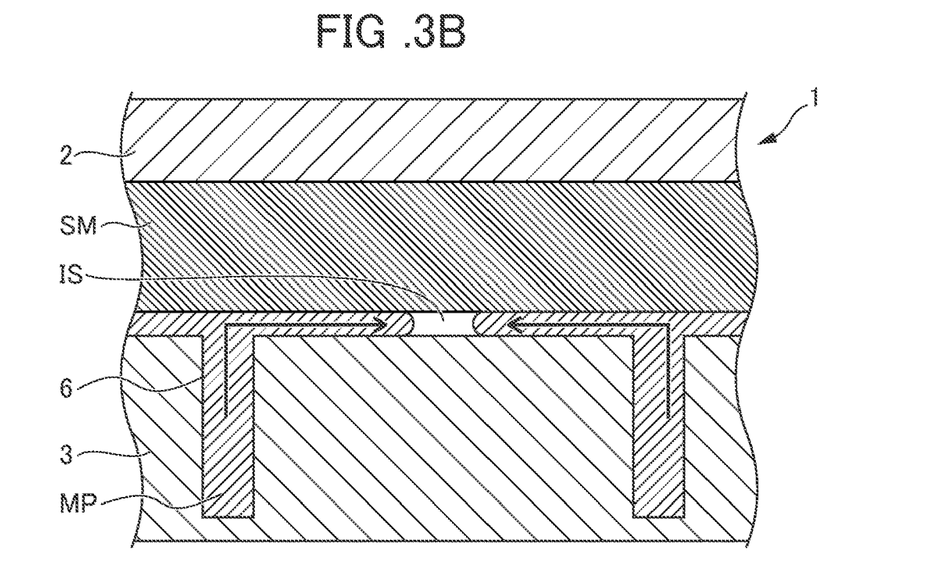
Figure 3C:
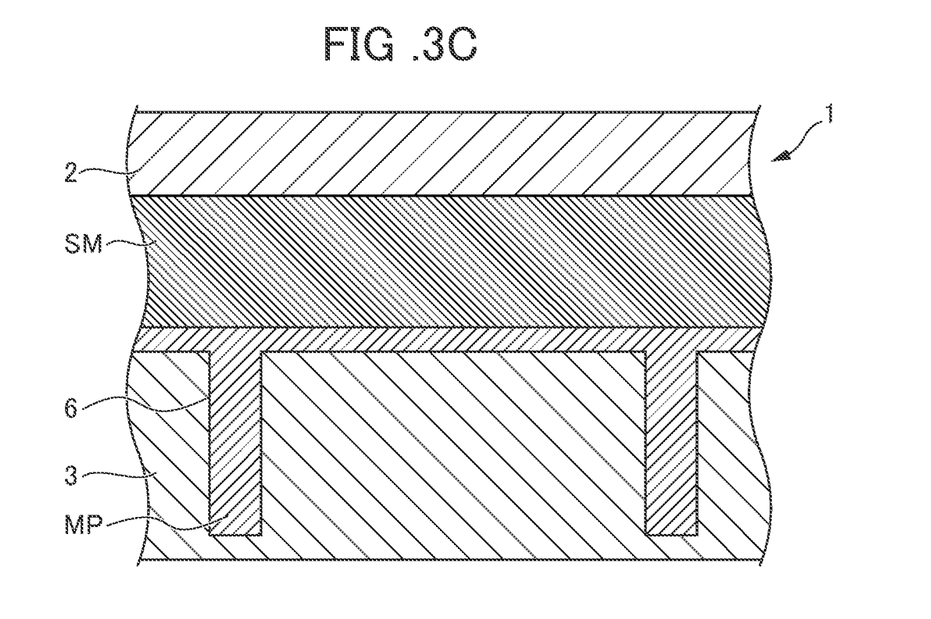
Figure 4A:
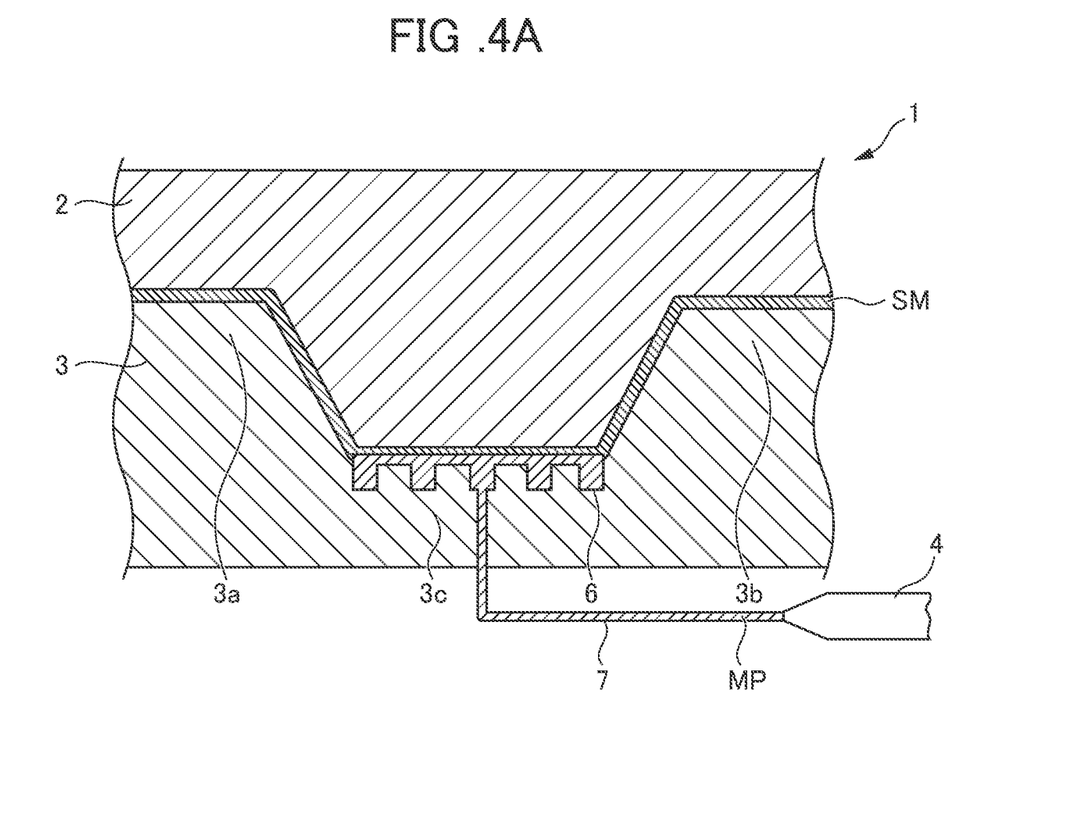
FIG. 4A is a schematic view illustrating the shapes of the sheet material SM and the molten resin MP during molding.
Figure 4B:
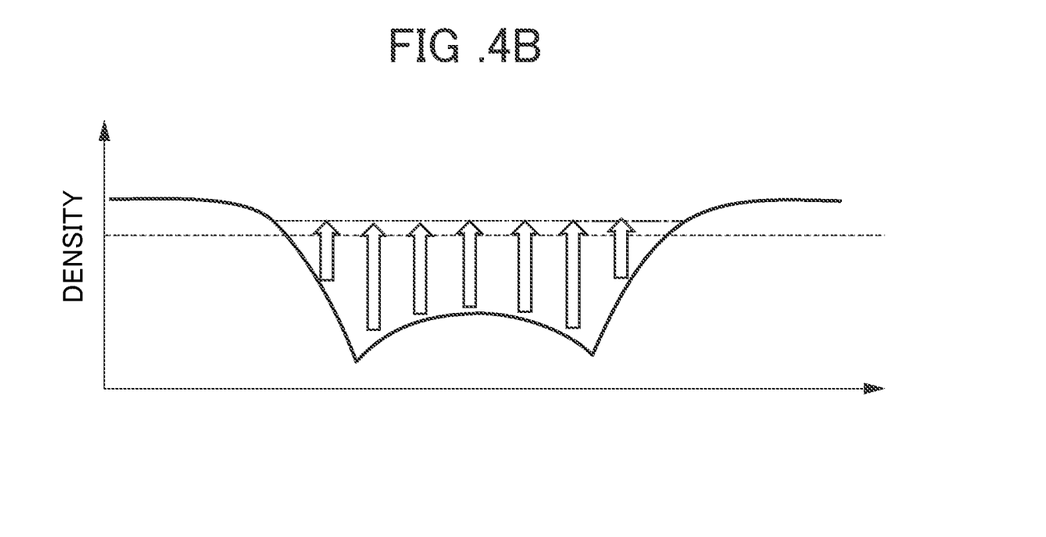
FIG. 4B is a graph illustrating the distribution of density of the sheet material SM and the molten resin MP.
Figure 5:
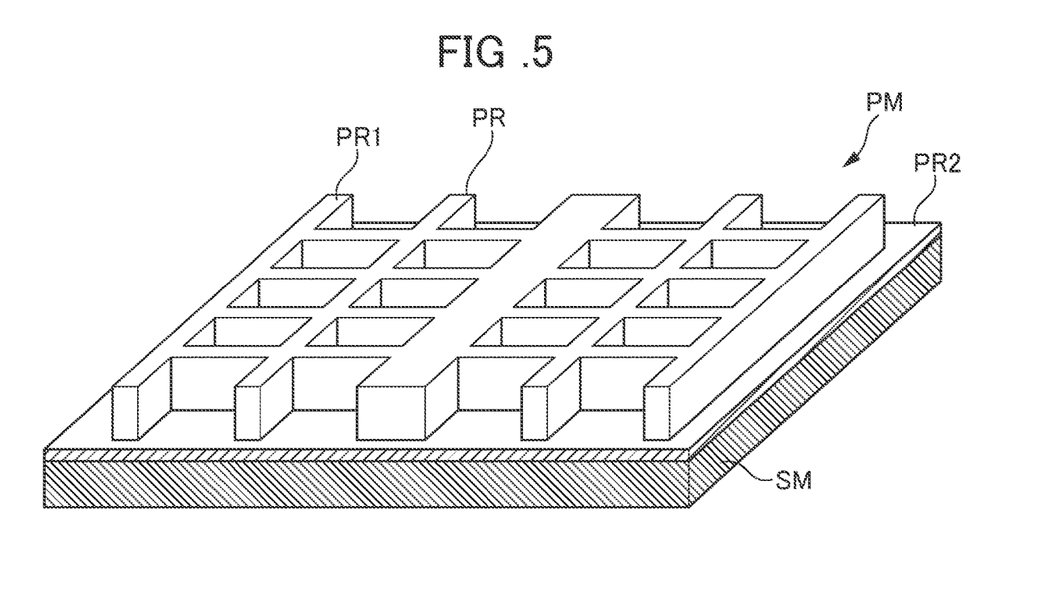
FIG. 5 is an external perspective view of a press-molded article PM.

An embodiment of the present invention will be described in detail with reference to the drawings. FIG. 1 is a longitudinal sectional view illustrating an FRP sheet press molding device 1 according to an embodiment of the present invention. FIG. 2A is an enlarged sectional view illustrating the main part of the FRP sheet press molding device 1. FIG. 2B is an enlarged sectional view illustrating a main part of a comparative example. FIGS. 3A to 3C are an enlarged sectional view of the FRP sheet press molding device 1 illustrating the flow of molding the press-molded article PM. FIG. 3A illustrates a state in which a plurality of rib molding grooves 6 is filled with molten resin MP. FIG. 3B illustrates a state in which the molten resin MP is pressurized and filled in the gap IS formed between the sheet material SM and the cavity 5 from the plurality of rib molding grooves 6. FIG. 3C illustrates a state in which the filling of the molten resin MP with respect to the gap IS generated between the sheet material SM and the cavity 5 is completed. FIG. 4A is a schematic view illustrating the shapes of the sheet material SM and the molten resin MP during molding. FIG. 4B is a graph illustrating the distribution of density of the sheet material SM and the molten resin MP. FIG. 5 is an external perspective view of the press-molded article PM.

The FRP sheet press molding device 1 illustrated in FIG. 1 is used when manufacturing a press-molded article (FRP molded article) PM (see FIG. 5), by press-molding a sheet material (FRP (glass/carbon) sheet material) SM of a fiber-reinforced plastic (FRP). Specifically, the FRP sheet press molding device 1 includes a pair of upper and lower molds 2 and 3, an injection molding machine 4, and the like.

The pair of upper and lower molds 2 and 3 is brought into contact with each other by the injection molding machine 4, and a force of several hundred tons or more is applied. The pair of upper and lower molds 2 and 3 constitutes a cavity 5 which serves as a space for pressing the sheet material SM between each other. The lower mold 3 has a plurality of rib molding grooves 6 in a lattice shape (a waffle shape) in a portion which faces the upper mold 2 to constitute the cavity 5, and in a portion corresponding to a part in which the pressed sheet material SM is narrowed and the density decreases. Further, the lower mold 3 has a sprue 7 connected to a plurality of rib molding grooves 6 and the like, that is, a sprue 7 connected to the cavity 5. On the cavity 5, the sheet material SM is disposed, and the molten resin MP is pressure-injected from the injection molding machine 4 via the sprue 7 and the plurality of rib molding grooves 6. The plurality of rib molding grooves 6 is used as a resin filling runner.

In the injection molding machine 4, a pair of upper and lower molds 2 and 3 is brought into contact with each other and a force of several hundred tons or more is applied. In the injection molding machine 4, a molten resin MP is pressure-injected into a cavity 5 formed between a pair of upper and lower molds 2 and 3 via the sprue 7 and the plurality of rib molding grooves 6.

Next, an FRP sheet press molding method using the FRP sheet press molding device 1 will be described with reference to FIG. 1.

The FRP sheet press molding method using the FRP sheet press molding device 1 is a method of molding the press-molded article PM, using the sheet material SM. The FRP sheet press molding method includes a press step and a filling step.

In the press step, the heated sheet material SM is pressed in the cavity 5 with the molds 2 and 3 closed.

In the filling step, while maintaining the closed state of the molds 2 and 3 from the press step, the molten resin MP is pressure-injected into the gap IS (see FIGS. 3A to 3C) generated between the sheet material SM and the cavity 5, and the surface of the sheet material SM and the surface of the molten resin MP are brought into contact with the cavity 5.

Next, the conceptual points of the FRP sheet press molding method using the FRP sheet press molding device 1 will be described with reference to FIGS. 2A and 2B.

Usually, a flow distance L of the pressure-injected molten resin MP is determined by a relation L/T with a thickness (a plate thickness) T of the space into which the molten resin MP is injected for each type of molten resin MP. This relation L/T is L/T=300 in the case of polyamide resin (PA). For example, when a molten resin MP which is a polyamide resin flows in a wide range (L=600 m), as illustrated in FIG. 2B, the plate thickness T=2 mm is required. That is, in order to press a thin sheet material SM (for example, 1 mm), a molten resin MP having a thickness of 2 mm needs to be pressure-injected so that the press-molded article PM becomes heavy and the cost increases.

Therefore, it is conceivable that the thickness T of the layer only for pressurization is made as thin as possible, but in this case, the flow distance L of the molten resin MP becomes short from the above relation L/T and an unfilled space is assumed. Therefore, as illustrated in FIG. 2A, by arranging a plurality of rib molding grooves 6 in a waffle state and by utilizing the plurality of rib molding grooves 6 as a runner, the substantial flow distance is shortened and the thin-wall pressure layer can be molded.

Next, a mechanism of the filling step in the FRP sheet press molding method using the FRP sheet press molding device 1 will be described with reference to FIGS. 3A to 3C.

As illustrated in FIG. 3A, the molten resin MP pressure-injected through the sprue 7 (see FIG. 1) is filled in the rib molding groove 6 having a relatively large space. Further, as illustrated in FIG. 3B, the molten resin MP filled in the rib molding groove 6 is filled and pressed from the rib molding groove 6 to the gap IS formed between the sheet material SM and the cavity 5. At this time, the substantial flow distance of the molten resin MP is short. Thereafter, as illustrated in FIG. 3C, the filling of the molten resin MP is completed.

Next, recovery of the density of the sheet material SM in the FRP sheet press molding method using the FRP sheet press molding device 1 will be described with reference to FIGS. 4A to 4B.

As illustrated in FIG. 4A, the lower mold 3 includes a narrowed part 3c constituting a drawing shape (a hat-shaped cross section) between the flat surface parts 3a and 3b, and the narrowed part 3c, and has a plurality of rib molding grooves 6.

As illustrated by a solid line in FIG. 4B, the sheet material SM subjected to the press step is narrowed around a portion corresponding to the narrowed part 3c of the mold 3, thereby reducing the density. Thereafter, the lowered density of the sheet material SM subjected to the filling step is increased (restored) with the pressure-injected molten resin MP as a medium, as indicated by a one-dot chain line in FIG. 4B.

Next, the structure of the press-molded article PM formed by the FRP sheet press molding method using the FRP sheet press molding device 1 will be described with reference to FIG. 5.

As illustrated in FIG. 5, the press-molded article (FRP molded article) PM includes a sheet material SM and an INJ molding part PR.

The sheet material SM is a fiber-reinforced plastic press-molded in the cavity 5 (see FIGS. 3A to 3C) of the molds 2 and 3 (see FIGS. 3A to 3C).

An INJ molding part PR is pressure-injected into the gap IS (see FIGS. 3A to 3C) formed between the sheet material SM and the cavity 5, and is obtained by curing the molten resin MP in which the surface of the sheet material SM and the surface of the molten resin MP is brought into contact with the cavity 5. The INJ molding part PR is a waffle-like part in which a plurality of lattice-like ribs PR1 and a thin-wall pressure layers PR2 are integrally formed.

According to the FRP sheet press manufacturing method of the present embodiment described above, the following effects are obtained.

That is, the FRP sheet press molding method is a method of molding a press-molded article PM using a sheet material SM of fiber-reinforced plastic, which includes a press step of press-molding a heated sheet material SM in a cavity 5 by closing the molds 2 and 3, and a filling step of pressure-injecting a molten resin MP into a gap IS formed between a sheet material SM and a cavity 5, while maintaining a closed state of the molds 2 and 3 from the press step, and bringing a surface of the sheet material SM and a surface of the molten resin MP into contact with the cavity 5.

In this way, according to the FPRP sheet press molding method, the density of the sheet material SM can be increased (restored), by pressure-injecting the molten resin MP to a portion in which the sheet material SM is narrowed and the density is lowered. Therefore, it is possible to mold the press-molded article PM along a shape of a molding surface of the cavity 5, without performing the opening/closing adjustment of the mold after clamping the molds 2 and 3. As a result, the yield of the press-molded article PM can be improved.

The cavity 5 is provided with a plurality of rib molding grooves 6, and in the filling step, it is preferable to use the plurality of rib molding grooves as a resin filling runner.

As a result, when the gap IS formed between the sheet material SM and the cavity 5 is small, the flow distance of the pressure-injected molten resin MP is short, and the rib molding groove 6 does not exist, even if a portion to be unfilled is assumed, it is possible to reliably fill the molten resin MP. Further, with regard to the press-molded article PM produced, it is possible to expect a reinforcing effect of strength and rigidity of the base material itself using the rib PR1.

The present invention is not limited to the above-described embodiment, and variations, improvements, and the like within the scope capable of achieving the object of the present invention are included in the present invention.

EXPLANATION OF REFERENCE NUMERALS

1 FRP SHEET PRESS MOLDING DEVICE
2, 3 MOLD (MOLDING DIE)
3a, 3b FLAT PART
3c NARROWED PART
4 INJECTION MOLDING MACHINE
5 CAVITY
6 RIB MOLDING GROOVE
7 SPRUE
SM SHEET MATERIAL (FIBER-REINFORCED PLASTIC)
MP MOLTEN RESIN (RESIN)
PR INJ MOLDING PART (RESIN)
PR1 RIB
PR2 THIN-WALL PRESSURE LAYER
IS GAP
PM PRESS-MOLDED ARTICLE (FRP MOLDED ARTICLE)

The invention claimed is:

1. An FRP sheet press molding device for molding a press-molded article with a fiber-reinforced plastic, using a molding die,
wherein the molding die includes a sprue connected to a cavity, a plurality of flat surface parts, a narrowed part forming a drawing shape between the flat surface parts, and a plurality of rib molding grooves provided in a lattice form in a portion of the molding die corresponding to the narrowed part,
after a heated fiber-reinforced plastic is press-molded in the cavity by closing the molding die to a closed state, and the fiber-reinforced plastic is narrowed in the narrowed part to lower a density, a resin is pressure-injected via the sprue into a gap formed between the fiber-reinforced plastic and the cavity, while maintaining the closed state of the molding die, and a surface of the fiber-reinforced plastic and a surface of the resin are brought into contact with the cavity, and the plurality of rib molding grooves is used as a resin filling runner.

\* \* \* \* \*